United States Patent [19]

Kaufman

[11] 4,243,136

[45] Jan. 6, 1981

[54] ICING PREVENTION SYSTEM FOR A CONVEYOR BELT

[76] Inventor: Michael J. Kaufman, R.D. #2, Box 102, Boswell, Pa. 15531

[21] Appl. No.: 19,669

[22] Filed: Mar. 12, 1979

[51] Int. Cl.³ .............................................. B65G 47/22
[52] U.S. Cl. ................................. 198/493; 198/500
[58] Field of Search ............. 198/493, 495, 500, 856; 134/58 R, 59 R, 95

[56] References Cited

U.S. PATENT DOCUMENTS

| | | | |
|---|---|---|---|
| 1,682,052 | 8/1928 | Radcliffe | 198/856 |
| 2,851,042 | 9/1958 | Spence | 134/57 R |
| 3,589,378 | 6/1971 | Swanson | 134/58 R |

Primary Examiner—Robert B. Reeves
Assistant Examiner—Douglas D. Watts
Attorney, Agent, or Firm—Brown, Flick & Peckham

[57] ABSTRACT

A pump for spraying an anti-freezing liquid on a conveyor belt exposed to freezing temperatures is controlled by an electric circuit containing a timer, a relay provided with a normally open switch, and a normally open thermostat that closes to start the timer when the ambient temperature falls below a given low temperature. The relay is connected in series with the timer switch and the thermostat to close the relay switch when both the timer switch and the thermostat are closed, whereby the pump will be operated until the timer times out or the thermostat reopens. If desired, the relay can be omitted.

5 Claims, 4 Drawing Figures

ICING PREVENTION SYSTEM FOR A CONVEYOR BELT

Conveyor belts for conveying coal or ore are often used in localities where the winter temperature falls below freezing. In freezing temperatures, the belts and their supporting rollers may become coated with ice, which not only interferes with operation of the belts but also may cause their loads to slide on the belts or oven off them. To prevent such icing, it has been proposed to spray anti-freeze liquid upon the belts periodically, but this has always been done manually, which requires the labor and attention of a workman.

It is among the objects of this invention to provide an icing prevention system for a conveyor belt which operates automatically, which only operates when the ambient temperature falls below a predetermined value, and which sprays the anti-freeze on the belt for a predetermined period of time and then automatically repeats the spraying at predetermined intervals if the cold temperature continues.

The preferred embodiment of the invention is illustrated in the accompanying drawings, in which FIG. 1 is a schematic side view, but showing one end of a conveyor belt;

Figure 1:
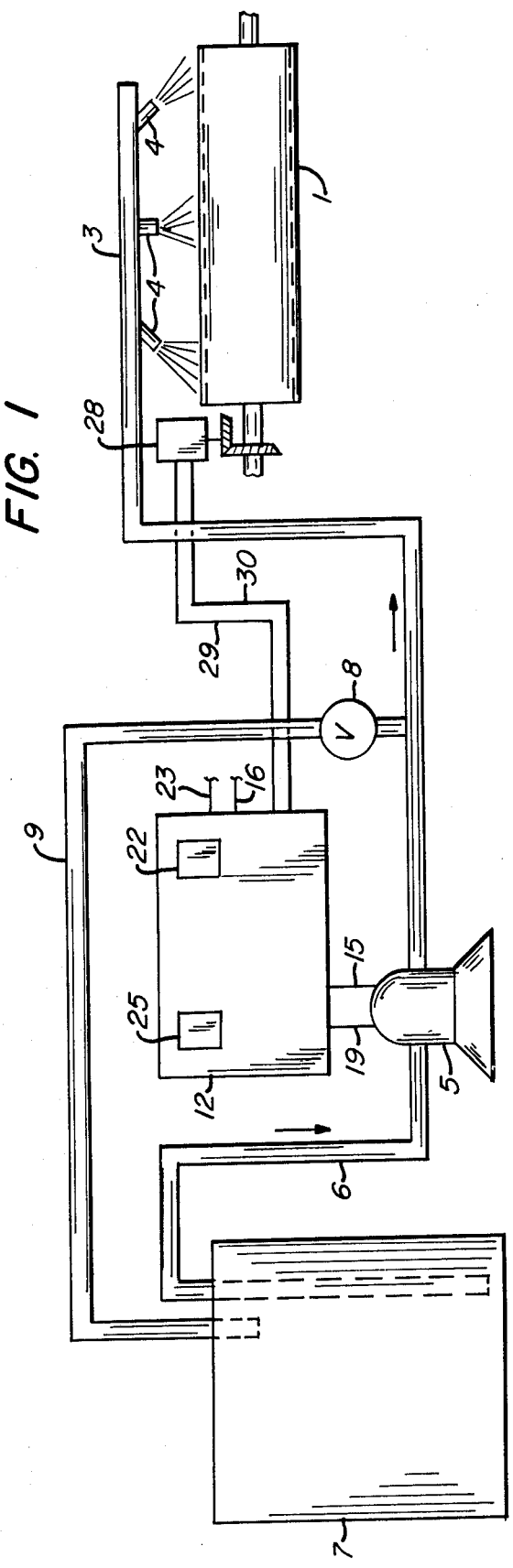
Figure 2:
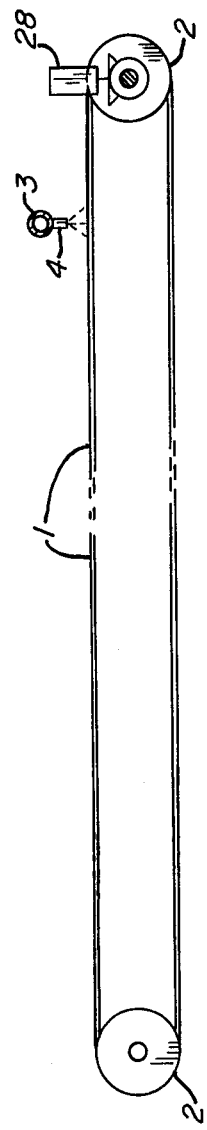
FIG. 2 is a side view of the belt.

Referring to FIGS. 1 and 2 of the drawings, an endless conveyor belt 1 is shown passing around rollers 2, at least one of which is driven. The upper length of the belt carries coal or ore. At a suitable point along the belt, a pipe 3 extends across the top of the belt and is provided with spray nozzles 4 directed toward the underlying belt. In most cases three nozzles are sufficient, the middle one being disposed at right angles to the pipe and the other two being inclined away from each other. The pipe is connected to the outlet of a suitable pump, such as an electrically driven gear pump 5, the inlet of which is connected by a pipe 6 to a tank 7 containing an anti-freeze liquid. Between the pump and the spray nozzles the connecting pipe 3 may be provided with a relief valve 8 connected to a pipe 9 that will return liquid to the tank to relieve pressure in pipe 3 if that becomes necessary. Also, if desired, the outlet of the pump can also be connected by a pipe to spray nozzles directed at rollers 2.

Figure 3:
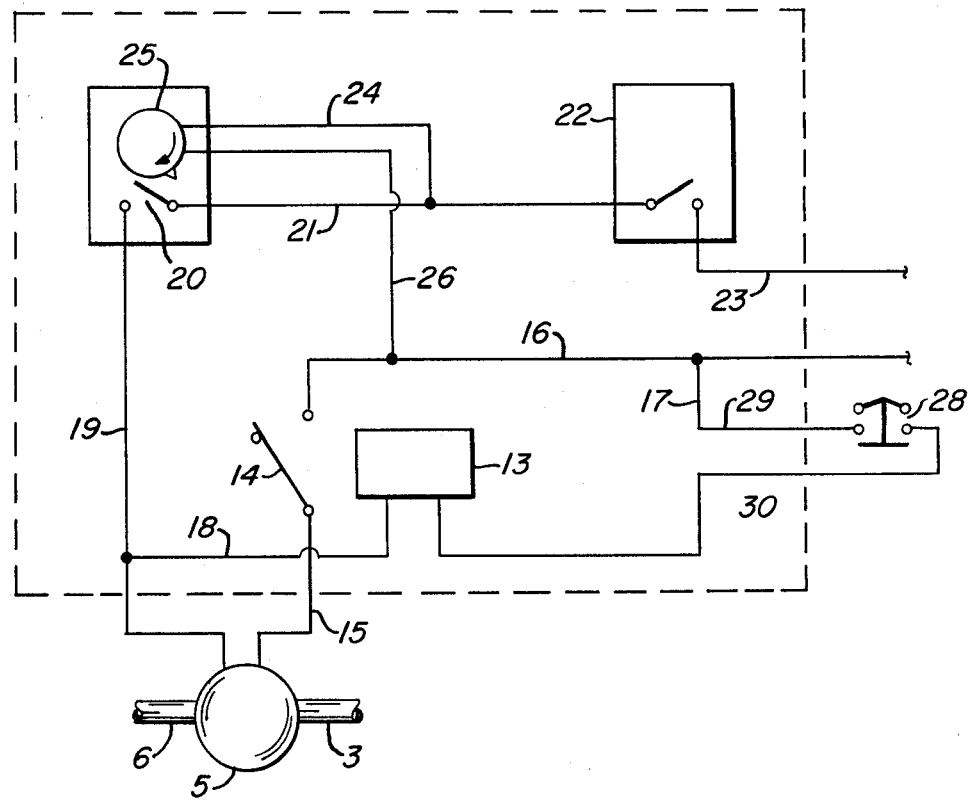
FIG. 3 is a wiring diagram for the system.

In order to drive the pump, a control module 12 is provided, in which there is a relay that includes a solenoid coil 13 and a switch 14, as shown in FIG. 3. One terminal of the switch is connected by a wire 15 with the pump and the other terminal of the switch is connected by wire 16 to a source of electric power. This same wire is connected by a wire 17 to one end of the relay coil, and the opposite end of the coil is connected by a wire 18 to a wire 19 connecting the pump with one contact of a timer switch 20. The other contact at the power side of this switch is connected by a wire 21 to a normally open thermostat 22, which also is connected by a wire 23 to the source of electric power. Wire 21 also is connected by a wire 24 to the timer 25, which closes and opens the timer switch. The timer also is connected by a wire 26 to wire 16. The relay switch normally is open, but the timer switch may be open or closed.

If it is desired to automatically prevent the pump from operating when the conveyor belt stops moving, one of the rollers 2 can be provided with a centrifugal switch 28 connected by wires 29 and 30 into wire 17 leading to the relay coil. In such a case, if the belt stops moving, the centrifugal switch will open and break the circuit to the relay coil, so the relay switch will open and stop the pump even though the thermostat and timer switch are closed.

OPERATION

When the ambient temperature falls below a predetermined level, such as 32° F., the thermostat 22 will close and, provided the timer switch 20 is closed, this will energize the relay coil 13 to close the relay switch 14 and start the pump 5. At the same time, the timer 25 starts to cycle. If the timer switch is not closed when the thermostat closes, cycling of the timer will close it eventually. Operation of the pump causes the anti-freeze to be sprayed on the conveyor belt and this continues until the timer times out and the timer switch opens, which opens the circuit to the relay coil so that the relay switch will open to stop the pump. However, as long as the thermostat remains closed, the timer will continue to operate and after a predetermined time, depending on the settling of the timer, it will again close the timer switch so that the relay switch will close and the pump will start operating again. This starting and stopping of the pump will continue as long as the ambient temperature remains below the thermostat setting. On the other hand, when the ambient temperature rises so that the thermostat opens, the circuit to the timer will be broken and the timer will cease operation. Even though the timer switch may be closed when the timer stops, the circuit to the relay coil will be broken at the thermostat and the pump will stop operating.

Figure 4:
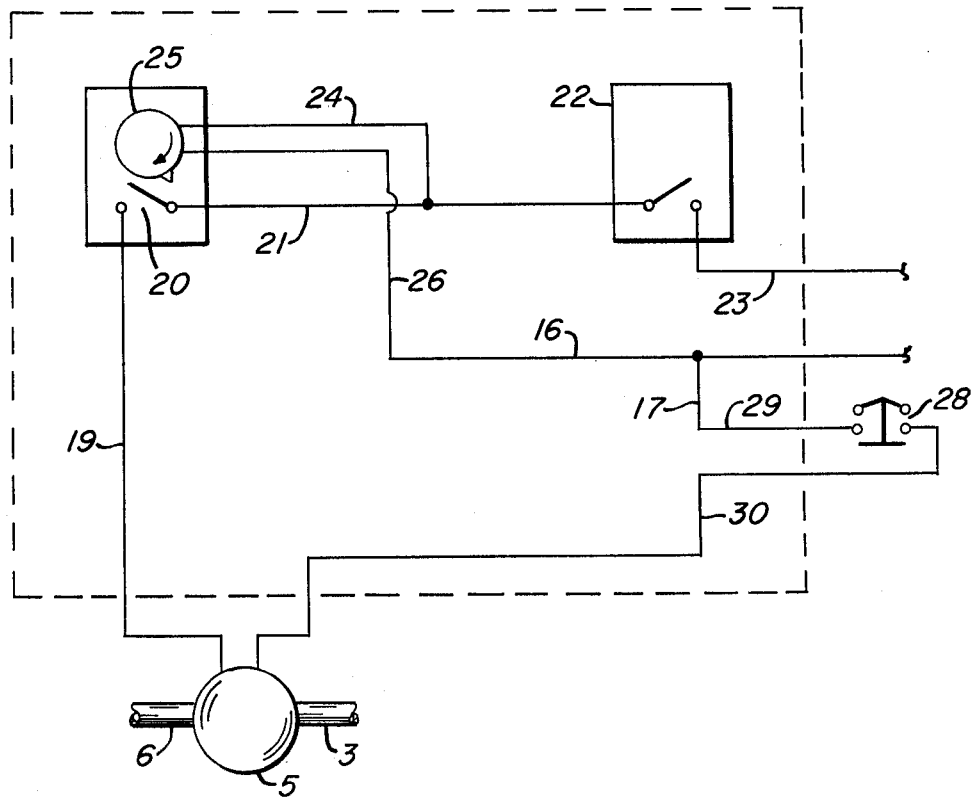
FIG. 4 is a wiring diagram of a modification.

In the modification shown in FIG. 4, the relay has been omitted and wire 30 has been connected directly to the pump. The elements in the circuit bear the same reference numbers as in FIG. 3 and the operation is the same, except that opening of either the thermostat or the timer switch will break the circuit directly to the electrically driven pump instead of indirectly through a relay switch.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. An icing prevention system for a conveyor belt exposed to freezing temperatures, comprising a tank for an anti-freeze liquid, a pump for withdrawing liquid from the tank and having an outlet, a spray nozzle connected with said outlet and adapted to be located adjacent a conveyor belt to spray the belt, an electric circuit for operating the pump, a timer switch in said circuit, an electrically operated timer for periodically closing said switch while the timer is operating, and a normally open thermostat in said circuit in series with said timer switch and timer for starting the timer when the ambient temperature falls below a predetermined low temperature and the thermostat closes, whereby said pump will be operated only while both the timer switch and the thermostat are closed.

2. An icing prevention system according to claim 1, including a normally open centrifugal switch adapted to be closed by a moving conveyor belt, and means electrically connecting the centrifugal switch in series in said circuit, whereby the pump will not operate if the belt is not moving.

3. An icing prevention system according to claim 1, including a relay having a normally open switch in said circuit that is in series with said pump, and means electrically connecting the relay in series with said timer switch and thermostat to close the relay switch when the timer switch and the thermostat close.

4. An icing prevention system according to claim 3, in which said connecting means electrically connect said relay with the pump side of said timer switch and with the side of the relay switch remote from the pump.

5. An icing prevention system according to claim 3, including a normally open centrifugal switch adapted to be closed by a moving belt conveyor, and means electrically connecting the centrifugal switch in series in said circuit, whereby the relay switch will not close while the centrifugal switch is open.

* * * * *